(No Model.) 4 Sheets—Sheet 1.

W. R. HINSDALE.
INGOT STRIPPING DEVICE.

No. 453,325. Patented June 2, 1891.

Attest:
L. Lee.
J. Van Nest Jr.

Inventor.
W. R. Hinsdale
per Crane & Miller, Attys.

(No Model.) 4 Sheets—Sheet 2.

W. R. HINSDALE.
INGOT STRIPPING DEVICE.

No. 453,325. Patented June 2, 1891.

Attest:
L. Lee.
J. Van Nest Jr.

Inventor.
W. R. Hinsdale, per
Crane & Miller, attys.

(No Model.) 4 Sheets—Sheet 3.
W. R. HINSDALE.
INGOT STRIPPING DEVICE.

No. 453,325. Patented June 2, 1891.

Attest:
L. Lee.
J. Van Nest Jr.

Inventor.
W. R. Hinsdale, per
Crane & Miller, attys.

(No Model.) 4 Sheets—Sheet 4.

W. R. HINSDALE.
INGOT STRIPPING DEVICE.

No. 453,325. Patented June 2, 1891.

Attest:
L. Lee.
J. Van Nest Jr.

Inventor.
W. R. Hinsdale, per
Crane & Miller, Attys.

United States Patent Office.

WILLIAM R. HINSDALE, OF NEWARK, NEW JERSEY.

INGOT-STRIPPING DEVICE.

SPECIFICATION forming part of Letters Patent No. 453,325, dated June 2, 1891.

Application filed January 10, 1891. Serial No. 377,310. (No model.)

*To all whom it may concern:*

Be it known that I, WILLIAM R. HINSDALE, a citizen of the United States, residing at Newark, Essex county, New Jersey, have invented certain new and useful Improvements in Ingot-Stripping Devices, fully described and represented in the following specification and the accompanying drawings, forming a part of the same.

This invention relates to that class of machines in which a series of ingots are cast in a series of divided mold-sections; and the object of the invention is to separate the mold-sections from the ingot, to facilitate the cooling of the ingots, and to diminish the labor required in handling the molds.

The invention is shown herein applied to the Boulton ingot-casting machine patented November 4, 1890, with No. 440,097, provided with the Boulton elevator patented June 12, 1888, with No. 384,385. In such casting-machines a series of ingots is formed in a series of separate mold-sections where they are discharged at intervals from the bottom of the apparatus, and the elevator is adjusted to receive the mold-sections successively with their contained ingots and to elevate them to a level with the top of the casting-machine.

My present invention consists in the combination, with a casting-machine and a guiding-trough arranged to receive the filled mold-sections from such machine, of a stop of smaller dimensions in cross-section than the bore of the molds for arresting the ingot while the mold is pushed therefrom. The mold may be propelled in the guiding-trough by mechanism, or the trough may be inclined downward and the mold moved within the same toward the stop by the action of gravity.

It also consists in the combination with the stop and a parting-tongue for dividing the mold.

Figure 1:
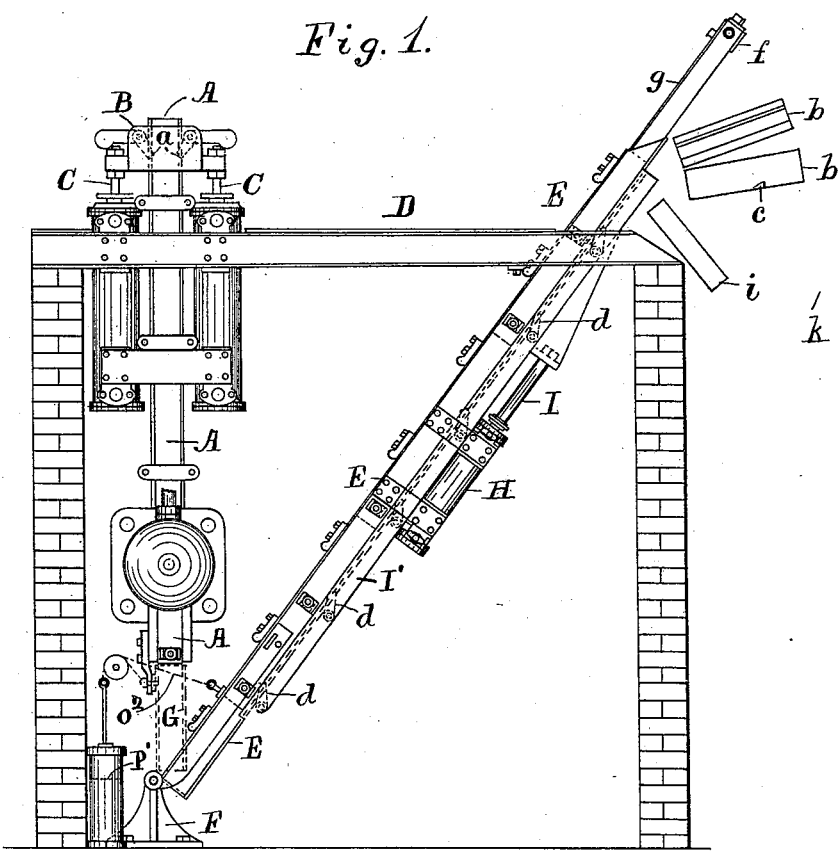
Figure 4:
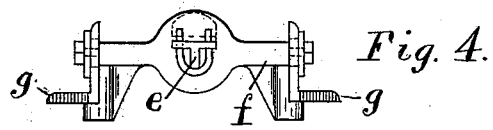
Figure 2:
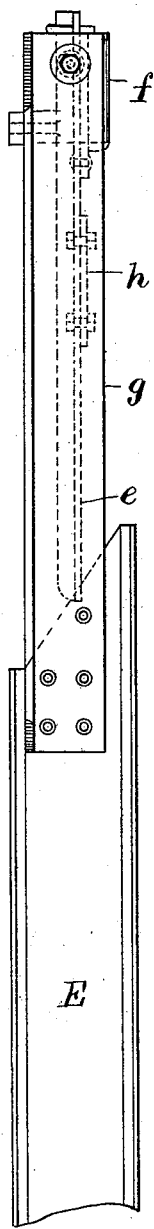
Figure 5:
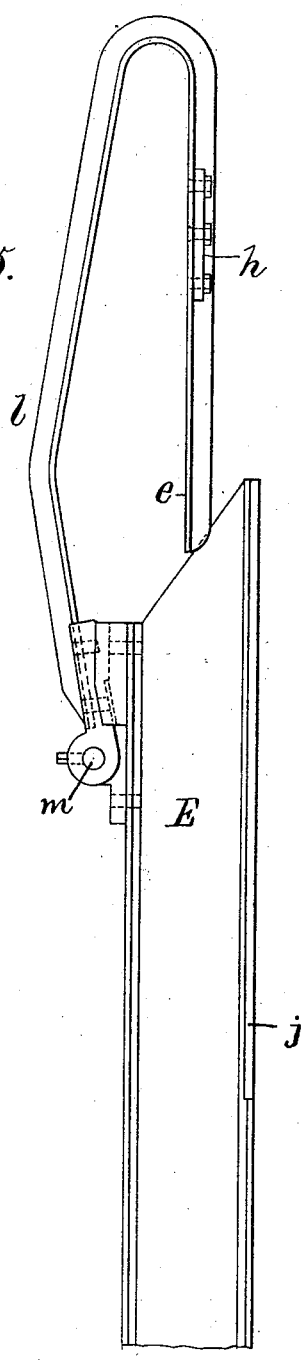
Figure 6:
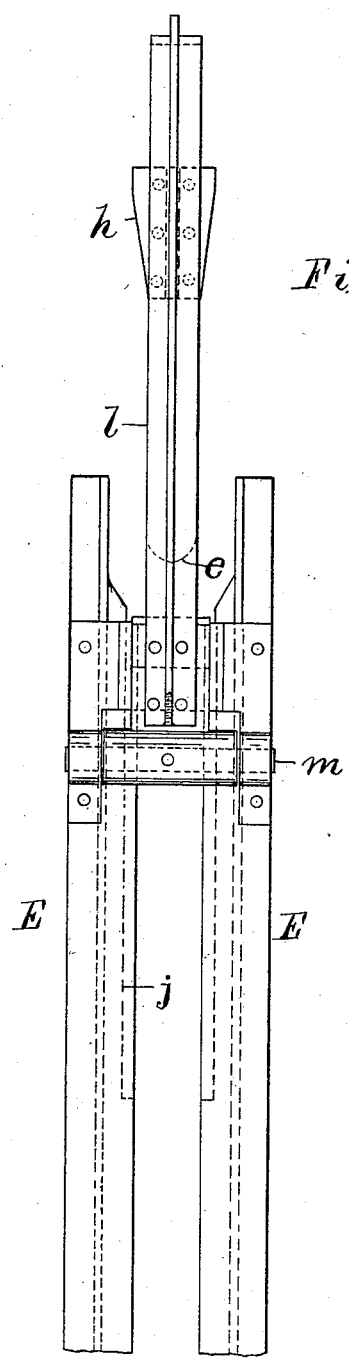
Figure 7:
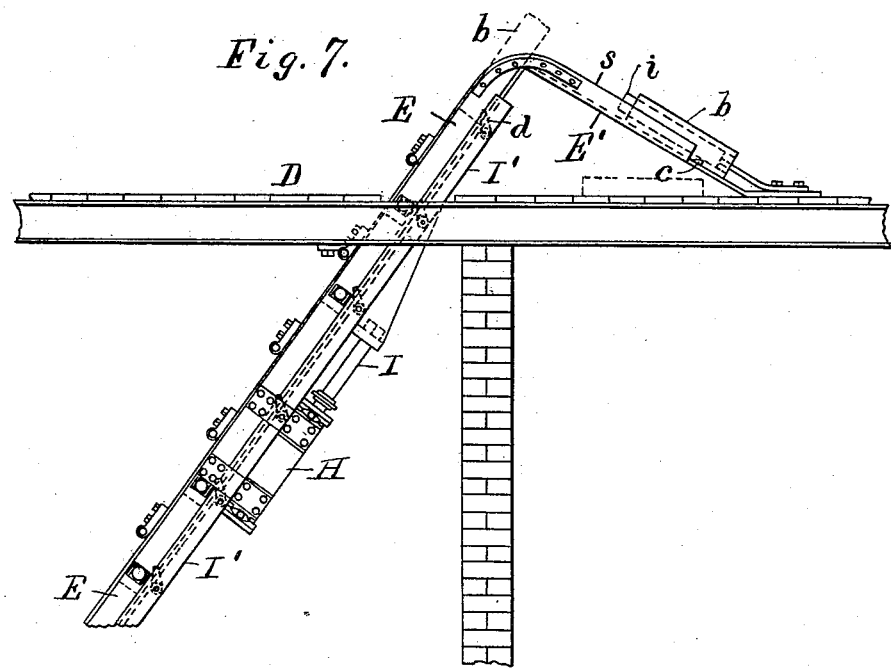

In the drawings, Figure 1 is a side elevation of the entire apparatus. Fig. 2 is an edge view, and Fig. 3 a side view, of the upper end of the guiding-trough with the stripping devices and with the ingot and mold-sections shown in dotted lines; and Fig. 4 is an end view of the parts shown in Fig. 3. Fig. 5 is an edge view, and Fig. 6 a side view, of the upper end of the guiding-trough with a movable stripper. Fig. 7 is a side elevation, and Fig. 8 a plan, of means for propelling the molds toward the stripper by gravity.

In Fig. 1, A is the mold-channel of the ingot-casting machine, through which the molds are propelled downward in succession as they are filled by pawls $a$, connected with a cross-head B, which is reciprocated by piston-rods C.

E is a guide-trough, having its lower end adjacent to the bottom of the channel A.

G is a movable carrier pivoted upon a standard F, by which the lower end of the trough E is sustained. The carrier is held automatically in line with the channel A by chain $o^2$, passed over a pulley and attached to a weight P'. The molds $b$ as they are successively discharged from the channel A fall singly into the carrier G and by their weight overbalance the latter and throw it into line with the trough E.

A hydraulic plunger I, movable in a cylinder H, is attached to a reciprocating bar $l'$, which is provided with a series of pawls $d$, adapted to engage notches $c$, formed in the sides of the molds. The reciprocation of the pawls $d$ by means of the plunger I raises the molds intermittingly in the guide-trough E and discharges them successively from the top of the trough.

The molds have heretofore been made in longitudinal halves to strip them from the ingots, and by the means described are elevated to the level of the pouring-floor D in readiness for subsequent use. By stripping them from the ingots they may again be inserted in the channel A to receive a charge of fluid metal, and a continuous series of ingots may thus be cast with a limited number of molds. It has been found, however, that the mold-sections are liable to stick to the ingots until the same had cooled and shrunken clear from the molds, and in such cases considerable labor is required to separate the mold-sections from the hot ingots.

In the present invention a stop is provided in the path of the ingot to arrest the same while the mold itself is moved forward and parted, by which means the ingots are stripped automatically, and the mold-sections are permitted to cool rapidly in readiness for renewed use.

The stop e (shown in Figs. 2 and 3) consists in a tongue attached to a cross-head f, sustained by holders g, attached to the sides of the guide-trough. The tongue is shown formed of a straight strip of T-iron to combine strength and lightness; but may be made of any form to enter the mold, and thus intercept the ingot without obstructing the advance of the mold. An open space $g'$, of suitable width, is provided between the holders to permit the mold-sections to fall clear of the same when separated, as shown at b in Fig. 1. In the same figure the ingot i is shown falling from the guide-trough at a lower point than the mold, which is caused by the advance of the mold under the influence of the pawls d after the ingot has been arrested by the stop.

Figure 3:
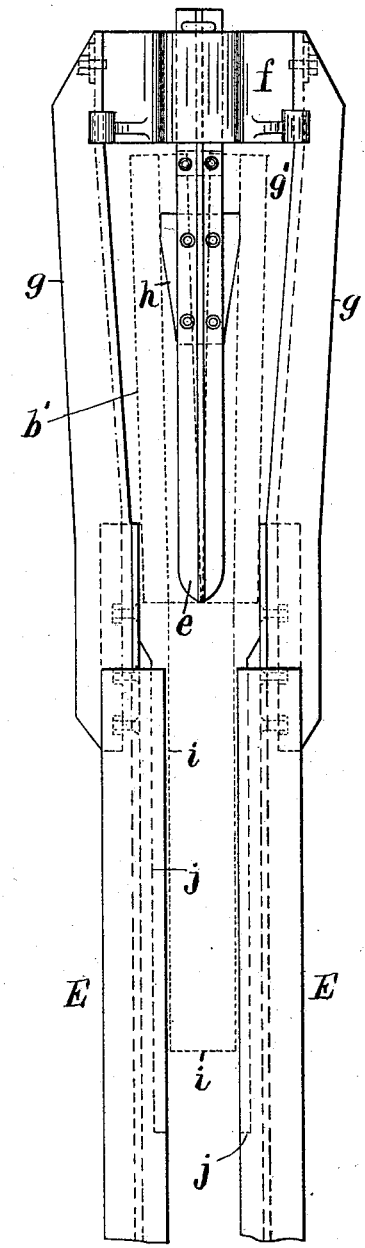

The ingot i is shown in Fig. 3 in contact with the end of the stop e, and notches j are shown cut from the edges of the guide-trough adjacent to the ingot to permit the same to fall readily from the lower side of the trough when the mold is moved forward, as indicated by the dotted lines $p'$ in Fig. 3. A wedge h is shown attached to the body of the tongue, which forms the stop to part the mold-sections as they are moved forward over the stop, which prevents them from adhering together when they are discharged from between the holders g.

It is common in operating an ingot-machine of the class shown in Fig. 1 to provide the first mold inserted in the machine with a bottom to retain the fluid metal, the subsequent molds being made bottomless to unite the charges of metal together. The bottom of the first mold would prevent its passage over the stop e, and it is therefore preferable in practice to make the stop removable. Such a construction is shown in Figs. 5 and 6, in which the tongue forming the stop is provided with a foot l, attached to the guide-trough by a pivot m. Such stop or tongue may be swung out of line with the passage in the guide-trough whenever it is necessary to discharge the molds from the trough with their contained ingots.

Figure 8:
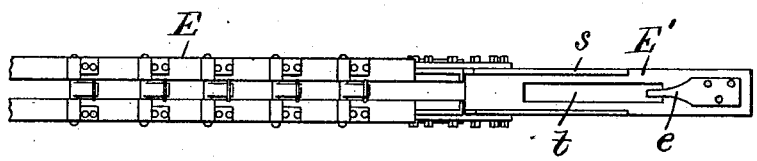

The essential feature of the invention is the guide-trough provided with a stop to arrest the ingot while the mold is moved forward to dislodge it from the casting; and Figs. 7 and 8 show an inclined guide-trough E', arranged in the same relation to the elevator guide-trough E as the partition k, (shown in Fig. 1,) to propel the filled molds toward a stop by gravity. The guide-trough E' consists simply in an inclined plane with shallow strips s at its edges to direct the molds toward the stop e, which is secured in line with the trough near its lower end. With this arrangement the filled molds are discharged from the elevator-trough E and fall into the guide-trough E', where they slide down until the ingot is arrested by the stop e, when the mold-sections move downward over the stop and fall upon the floor at each side of the guide, as indicated by the dotted lines $b^2$. The ingot i may remain upon the trough E', or an aperture may be made of suitable width beneath the ingot to permit it to fall into a car or other receptacle. Such opening is shown at t in Fig. 8, which, if a clear space were left beneath the trough, would permit the ingots to fall into any suitable receptacle and would automatically separate them from the molds, which could be retained upon the floor adjacent to the guide.

Reference has been made to the use of a shifting or swinging stop to permit the passage of the mold. Such a construction is essential where the molds are filled in a continuous series in a casting-machine, as it is common in such cases to use a mold having a solid bottom when commencing the operation of such a machine. The metal poured into such mold is thus retained until cool, while the metal poured into the subsequent molds is retained by its contact with the metal in the molds below it in the series.

Having thus set forth my invention, what I claim herein is—

1. The combination, with an ingot-casting machine and a guide-trough for receiving the molds from the same, of a stop of smaller dimensions in cross-section than the bore of the molds, adapted to penetrate the molds and to arrest the ingots while permitting the passage of the mold, substantially as set forth.

2. The combination, with an ingot-casting machine and a guide trough for receiving the molds from the same, of a stop secured removably to the guide-trough and adapted to penetrate the molds to arrest the ingots, substantially as set forth.

3. The combination, with an ingot-casting machine and a guide-trough for receiving the molds from the same, of a stop secured removably to the guide-trough and adapted to penetrate the molds to arrest the ingots, the bottom of the said trough being formed with an aperture to discharge the ingots, substantially as set forth.

In testimony whereof I have hereunto set my hand in the presence of two subscribing witnesses.

WILLIAM R. HINSDALE.

Witnesses:
 THOS. S. CRANE,
 L. LEE.